US008611891B2

(12) United States Patent
Selig et al.

(10) Patent No.: US 8,611,891 B2
(45) Date of Patent: *Dec. 17, 2013

(54) METHOD AND SYSTEM FOR MANAGING SUBSCRIBER IDENTITY MODULES ON WIRELESS NETWORKS FOR MACHINE-TO-MACHINE APPLICATIONS

(71) Applicant: Numerex Corp., Atlanta, GA (US)

(72) Inventors: Gregory W. Selig, Canton, GA (US); Patrick Aidee, Willingboro, NJ (US)

(73) Assignee: Numerex Corp., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,460

(22) Filed: Nov. 20, 2012

(65) Prior Publication Data

US 2013/0079051 A1    Mar. 28, 2013

Related U.S. Application Data

(63) Continuation of application No. 13/345,018, filed on Jan. 6, 2012, now Pat. No. 8,412,186.

(60) Provisional application No. 61/430,763, filed on Jan. 7, 2011.

(51) Int. Cl.
*H04W 4/00* (2009.01)

(52) U.S. Cl.
USPC ......... 455/426.1; 455/558; 370/328; 370/329

(58) Field of Classification Search
USPC ........... 455/432.1, 411, 436, 433, 426.1, 558, 455/449, 428; 370/328, 329, 349; 380/247; 713/169; 340/5.8
See application file for complete search history.

(56) References Cited

U.S. PATENT DOCUMENTS

| | | | |
|---|---|---|---|
| 7,379,736 B2 * | 5/2008 | Hochscherff et al. | 455/432.1 |
| 2002/0082049 A1 * | 6/2002 | Prise | 455/558 |
| 2002/0090932 A1 * | 7/2002 | Bhatia et al. | 455/412 |
| 2004/0087305 A1 * | 5/2004 | Jiang et al. | 455/432.1 |
| 2005/0020280 A1 | 1/2005 | Holland et al. | |
| 2006/0217153 A1 * | 9/2006 | Coles et al. | 455/558 |
| 2006/0234772 A1 * | 10/2006 | Gill et al. | 455/558 |
| 2007/0049269 A1 * | 3/2007 | Ophir et al. | 455/432.1 |
| 2007/0054665 A1 * | 3/2007 | Elkarat et al. | 455/432.1 |
| 2007/0117551 A1 | 5/2007 | Boris et al. | |
| 2007/0123252 A1 | 5/2007 | Tronc et al. | |
| 2008/0039115 A1 * | 2/2008 | Haugli et al. | 455/456.1 |
| 2009/0286542 A1 | 11/2009 | Roberts et al. | |
| 2010/0002582 A1 * | 1/2010 | Luft et al. | 370/230.1 |
| 2012/0028606 A1 * | 2/2012 | Bobotek | 455/411 |

FOREIGN PATENT DOCUMENTS

| | | |
|---|---|---|
| GB | 2395621 | 5/2004 |
| WO | WO 01/05169 | 1/2001 |
| WO | WO 2009/127238 | 10/2009 |

OTHER PUBLICATIONS

International Search Report from PCT/US2012/020477, Feb. 26, 2013.

* cited by examiner

*Primary Examiner* — Mahendra Patel

(74) *Attorney, Agent, or Firm* — King & Spalding

(57) ABSTRACT

A mobile station connected to a wireless network can comprise a subscriber identity module. The subscriber identity module can maintain a list of networks. The list can comprise forbidden public land mobile network data. Software can manage the forbidden public land mobile network data. For example, an applet transmitted to the subscriber identity module can periodically delete entries from the list and/or reset the subscriber identity module on predefined time intervals or when specified events occur.

18 Claims, 4 Drawing Sheets

METHOD AND SYSTEM FOR MANAGING SUBSCRIBER IDENTITY MODULES ON WIRELESS NETWORKS FOR MACHINE-TO-MACHINE APPLICATIONS

CROSS REFERENCE TO RELATED APPLICATIONS

This patent application is a continuation application of U.S. patent application Ser. No. 13/345,018, now U.S. Pat. No. 8,412,186, filed Jan. 6, 2012, which claims priority under 35 U.S.C. §119 to U.S. Provisional Patent Application No. 61/430,763, entitled "Method for Automatic Management of SIM Resident Forbidden Networks in Unmanned Machine Embedded Applications" and filed Jan. 7, 2011 in the name of Patrick Aidee and Greg Selig, the entire contents of which each are hereby incorporated herein by reference.

FIELD OF THE TECHNOLOGY

The present invention relates generally to managing a subscriber identity module of a mobile station that is connected to a wireless network and that may be associated with a machine for machine-to-machine communication, and more specifically to automatic or periodic deletion of networks that are marked as forbidden to the subscriber identity module.

BACKGROUND

When a wireless telecommunications system mobile station ("MS") detects the presence of signals from a system technically compatible with the mobile station, the mobile station will attempt to register or make its presence known with the system. Industry standard specifications provide details of a typical registration process, such as the standards identified as 3GPP TS 23.122 and 3GPP TS 11.11, which are available from the $3^{rd}$ Generation Partnership Project ("3GPP"), and others.

If the registration is denied, the mobile station will create a data entry in its subscriber identity module ("SIM"), also known as a subscriber identification module, indicating that the system is a forbidden public land mobile network ("FPLMN"). The mobile system then uses this entry, in the future, to avoid further registration attempts on such forbidden system(s). As described in the aforementioned industry standards, the forbidden public land mobile network list, if existing, is deleted when the mobile station is switched off or when the subscriber identity module is removed, thus permitting another, future attempt at registration with the formerly forbidden system.

For cell phones and other personal handheld devices, such resetting of the forbidden public land mobile network list on device power cycles offers advantages as the nature or reason for registration denial is fluid and may change. In other words, in some future registration, the mobile station may not be denied. For example, denial would no longer be appropriate if, in the interim, a roaming contract was enacted between the serving system and the mobile system's home system. Accordingly, conventional industry standard operations for dealing with forbidden public land mobile network data are suitable for many portable mobile stations that are subject to frequent power cycling or subscriber identity module removals, such as in a personal wireless telecommunications handset.

However, such conventional approaches can be detrimental for a mobile station integrated as the communications link for unmanned applications that may involve telemetry, asset tracking, device monitoring and other applications generally referred to in the industry's vernacular as "M2M" products, which stands for machine-to-machine. A typical mobile station used in a machine-to-machine application will not normally encounter frequent power cycles or subscriber identity module removals. Furthermore, since such machine-to-machine mobile station applications are typically unmanned and geographically dispersed, power cycling a mobile station in order to flush the forbidden public land mobile network list would typically involve a manned site visit. Such visits can be expensive and difficult.

Accordingly, conventional approaches that rely on current industry standards for managing forbidden public land mobile network lists are largely ill suited to machine-to-machine applications. The field lacks an affordable and efficient method of deleting forbidden public land mobile network data for mobile stations used in a machine-to-machine applications.

In view of the foregoing discussion of representative deficiency in the art, need is apparent for improved management of subscriber identify modules. Need exists for autonomous manipulation or deletion of forbidden public land mobile network data of a subscriber identity module. Need exists for a technology that can periodically delete forbidden public land mobile network data of a mobile station. Need exists for a capability to eliminate costly, in-person visits to mobile stations by a technician in order to delete forbidden public land mobile network data. Need exists for an automated capability to load a software program into a remote mobile station's subscriber identity module of a mobile station, for periodically deleting forbidden public land mobile network data of the mobile station. A capability addressing one or more such needs, or some related deficiency in the art, would promote machine-to-machine systems and applications as well as the general field of wireless communications.

SUMMARY

The present technology supports managing data stored in memory at a mobile station, for example a network list maintained at a subscriber identity module of the mobile station.

In one aspect of the present invention, a mobile station connected to a wireless network can comprise a subscriber identity module. The subscriber identity module can maintain data regarding forbidden public land mobile networks. A computer program loaded on the subscriber identity module can manage the data. The computer program can periodically delete part or all of the data. The computer program can determine deletion times and/or take other actions by tracking the number of communications received or observed over the wireless network, where the communications occur with some level of regularity.

The discussion of managing wireless communication systems presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
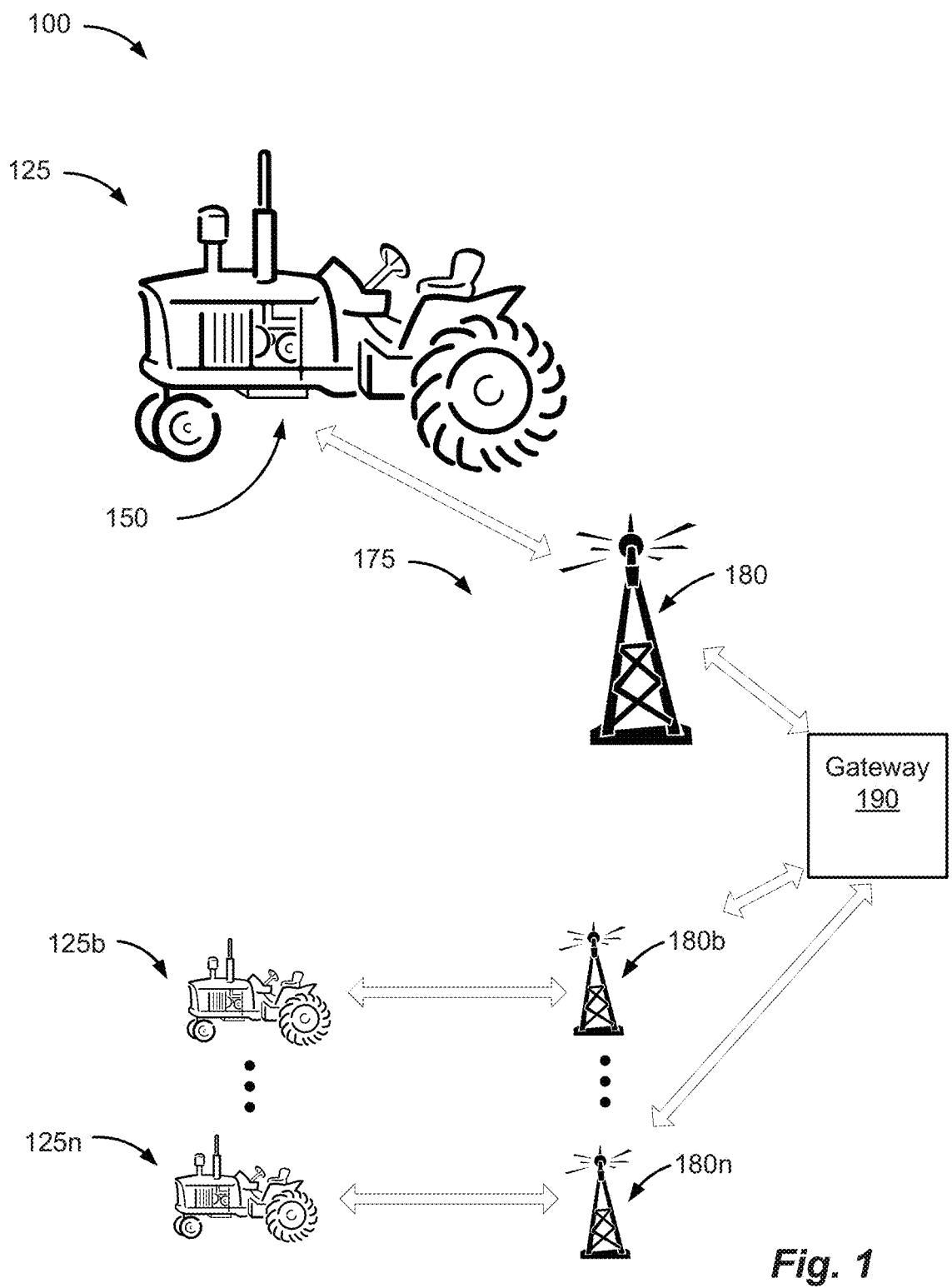
FIG. 1 is an illustration of an exemplary wireless system supporting machine-to-machine applications in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help convey such principles visually. In the drawings, reference numerals designate like or corresponding, but not necessarily identical, elements throughout the several views.

DETAILED DESCRIPTION OF EXEMPLARY EMBODIMENTS

In accordance with certain exemplary embodiments of the present invention, a computer-based method or process can manage data maintained at a subscriber identity module of a mobile station, such as a list of forbidden public land mobile networks stored in memory of a subscriber identity module. A software module executing on the subscriber identity module can implement the method or process. The software module, which can take the form of an applet, can be transmitted wirelessly to the mobile station, such as over a cellular network.

Certain exemplary embodiments of the present invention support automatically clearing one or more forbidden networks from memory in a subscriber identity module of a mobile station. The mobile station can be part of a network of mobile stations providing communication links for unmanned, geographically dispersed applications. Automatic management of forbidden network data in machine-to-machine applications can enhance functionality in fluid network environments, for example reducing costs, improving efficiency, and avoiding many onsite technician visits.

Such machine-to-machine applications can comprise two devices communicating with one another wirelessly. The communications can involve telemetry. For example, sensors can detect or capture events, such as a change in temperature, speed, or some other parameter, and relay information about such events through a communication, information, or computing network. A hub, gateway, or manager can process and/or aggregate event information, for example in connection with providing a human interface.

In certain exemplary embodiments of the present invention, a software program can reside in one or more subscriber identity modules of one or more mobile stations. The software program can delete forbidden public land mobile network data of such mobile station or stations periodically and/or programmatically. The software program can periodically or automatically delete one or more networks from a list of networks that are marked as forbidden to the subscriber identity module. In certain embodiments, the software program can be transferred from a remote location into one or more subscriber identity modules of one or more mobile stations. In certain embodiments, the software program comprises a JAVA software program applet. In certain embodiments, the software program resets one or more data files located in a subscriber identity module. In certain embodiments, the software program resets the subscriber identity module and/or an associated wireless modem if the mobile station has not a successful global system for mobile communications ("GSM") registration within a specified amount of time after power up, for example within fifteen minutes or some other appropriate time. In certain embodiments, the software program restores one or more data files located in a subscriber identity module of a mobile station to a predetermined state when the mobile station fails registration. In certain embodiments, the software program restores one or more data files located in a subscriber identity module of a mobile station to a predetermined state when the mobile station does not successfully register within a predetermined time period. In certain embodiments, the software program restores one or more data files located in a subscriber identity module of a mobile station to a predetermined state at a predetermined time. In certain embodiments, the software program resets a subscriber identity module of a mobile station periodically, for example daily or every twenty-four hours or at some other appropriate interval.

Certain exemplary embodiments of the present invention can comprise a method or process for automatic management of subscriber identity module resident forbidden networks in unmanned applications. Certain exemplary embodiments of the present invention can comprise a method or process for automatic management of subscriber identity module resident forbidden networks in machine embedded applications.

Figure 2:
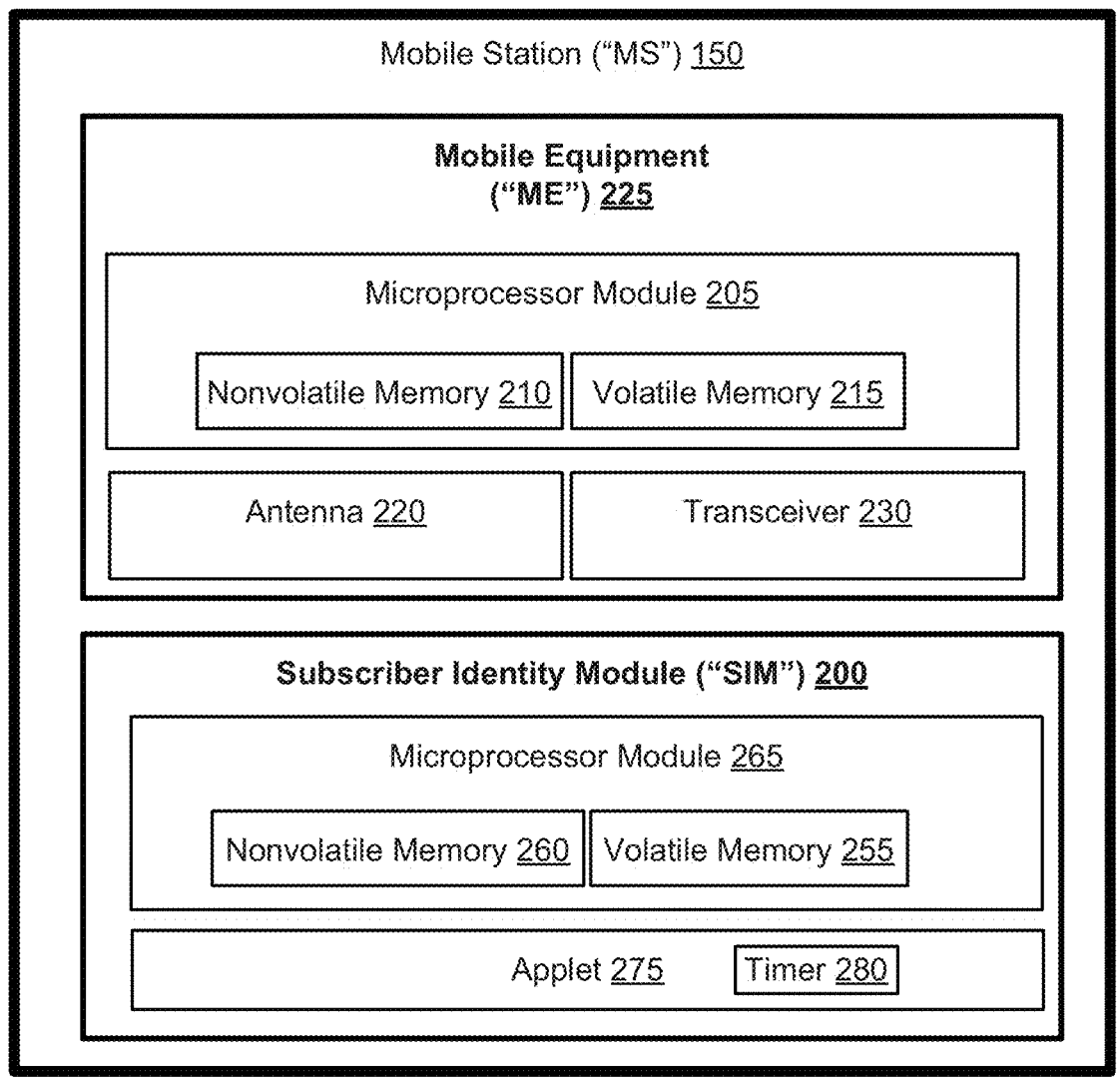
FIG. 2 is an functional block diagram of an exemplary mobile station in accordance with certain embodiments of the present invention.
Figure 3:
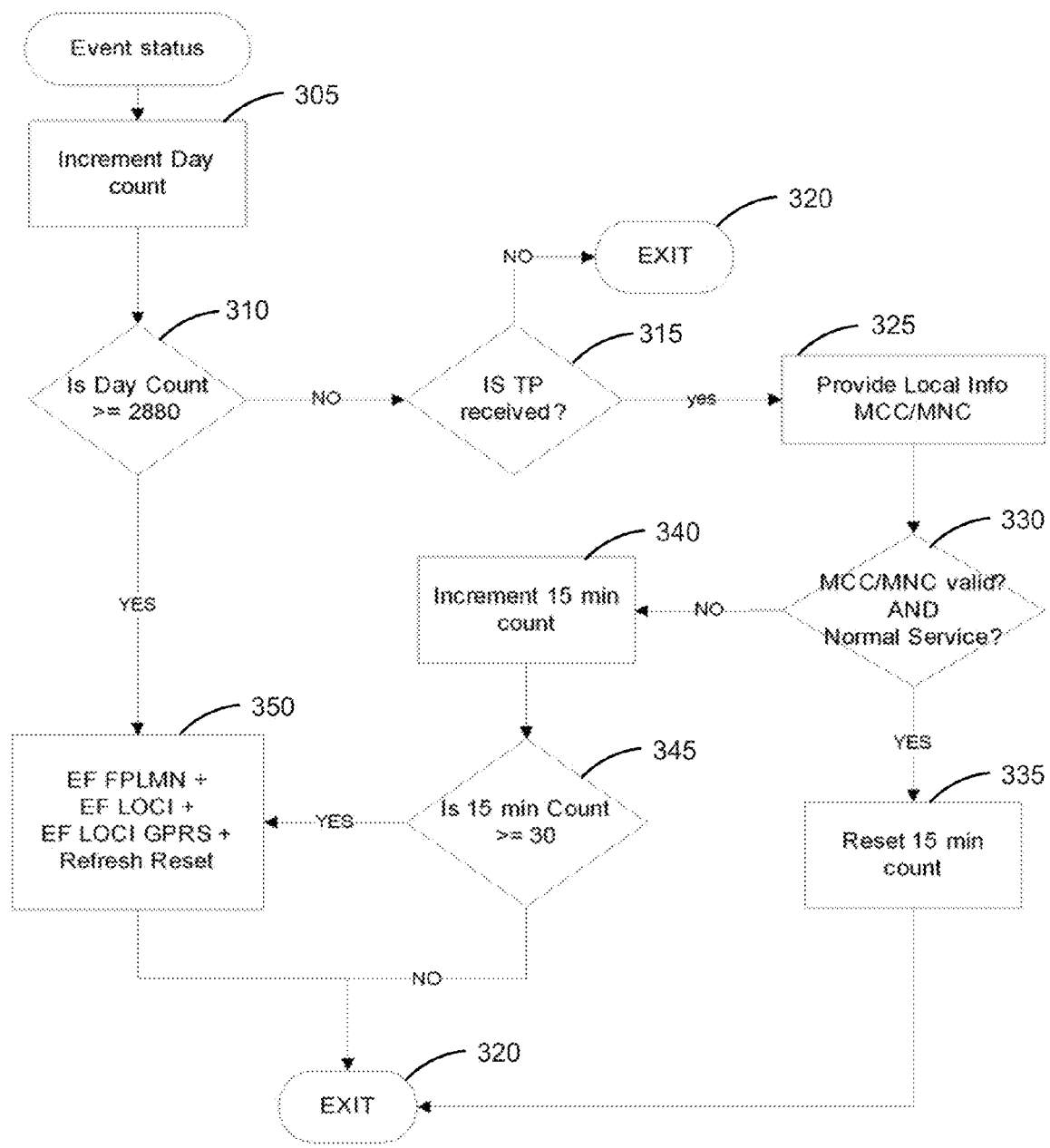
FIG. 3 is a flowchart for an exemplary process for managing a subscriber identity module in accordance with certain embodiments of the present invention.
Figure 4:
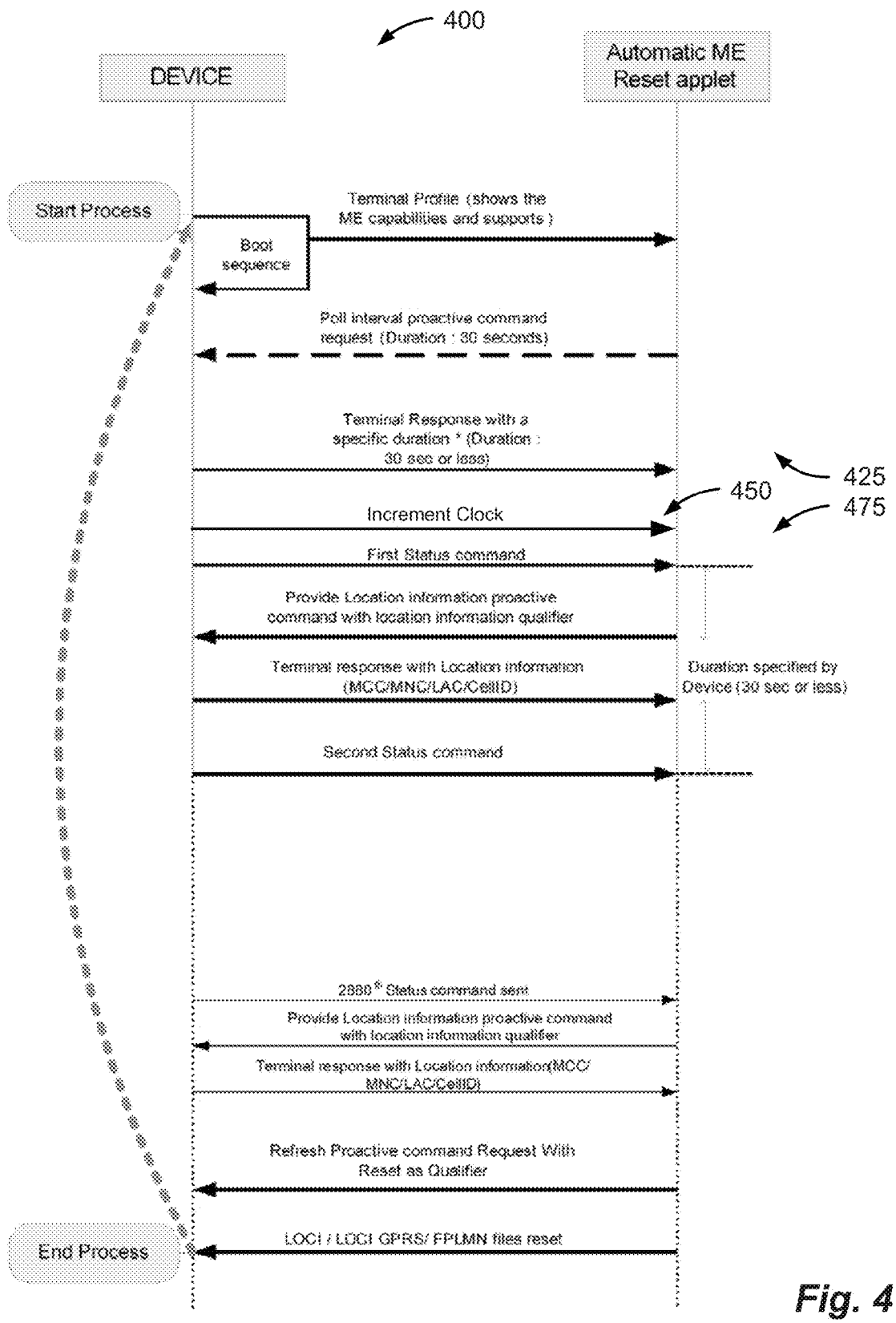
FIG. 4 is an illustration of exemplary poll interval logic for managing a subscriber identity module in accordance with certain embodiments of the present invention.

Technology for managing subscriber identity modules will now be discussed more fully hereinafter with reference to FIGS. 1-4, which describe representative embodiments of the present invention. In the context of a representative operating environment for certain embodiments of the present invention, FIG. 1 describes a representative wireless network comprising a mobile station associated with a machine. The illustrated mobile station can be a machine-to-machine mobile station. FIG. 2 describes a representative embodiment of the mobile station that comprises a subscriber identity module. FIGS. 3 and 4 describe a representative process for managing the subscriber identity module.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a wireless system 100 supporting machine-to-machine applications according to certain exemplary embodiments of the present invention. As illustrated, a cellular network 175 comprises cell towers 180, 180b, ... 180n that link multiple machines 125, 125b, ... 125n to a gateway 190. The cellular network 175 can comprise a radiotelecommunications network such as the global system for mobile communications ("GSM") system or the universal mobile telecommunications system ("UMTS") system, for example.

The machine 125 is illustrated in exemplary form as a tractor. Other machines that can be supported include road vehicles, sensors, vending machines, meters, gauges, pumps, motors, industrial equipment, manufacturing machines, electrical equipment, transformers (that may or may not have moving parts), generators, and computing equipment, to mention a few representative examples without limitation.

As will be discussed in further detail below, each machine 120 has an associated mobile station 150 that sends and receives wireless signals over the cellular network. The gateway 190 can provide an interface to the machines 125, 125b, . . . 125n for connectivity to a managing computer-based system that may comprise a human interface.

In certain exemplary embodiments, the wireless system 100 illustrated in FIG. 1 comprises one or more of the technologies disclosed in U.S. Pat. No. 7,936,256, entitled "Method and System for Interacting with a Vehicle Over a Mobile Radio Telephone Network" and issued on May 3, 2011 in the name of Tomas Murray and Edward R. Jansson. The entire contents of U.S. Pat. No. 7,936,256 (entitled "Method and System for Interacting with a Vehicle Over a Mobile Radio Telephone Network" and issued on May 3, 2011 in the name of Tomas Murray and Edward R. Jansson) are hereby incorporated herein by reference.

In certain exemplary embodiments, the wireless system 100 illustrated in FIG. 1 of the present application can comprise a cellular-based system in accordance with the disclosure in U.S. Pat. No. 7,936,256, for example the cellular-based system that is referenced as "cellular-based system 100" in U.S. Pat. No. 7,936,256 and that is illustrated in the FIG. 1 and described in the specification of U.S. Pat. No. 7,936,256.

In certain exemplary embodiments, the wireless system 100 illustrated in FIG. 1 of the present application can comprise a cellular mobile radiotelephone system in accordance with the disclosure of U.S. Pat. No. 7,936,256, for example the cellular mobile radiotelephone system that is referenced as "CMR system 8" in U.S. Pat. No. 7,936,256 and that is illustrated in the FIGS. 1, 3A, and 3B and described in the specification of U.S. Pat. No. 7,936,256.

In certain exemplary embodiments, the vehicle 100 illustrated in FIG. 1 of the present application can comprise a vehicle in accordance with the disclosure of U.S. Pat. No. 7,936,256, for example the vehicle that is referenced as "vehicle 105" in U.S. Pat. No. 7,936,256 and that is illustrated in the FIGS. 1 and 2 and described in the specification of U.S. Pat. No. 7,936,256.

In certain exemplary embodiments, the gateway 190 illustrated in FIG. 1 of the present application can comprise a gateway in accordance with the disclosure of U.S. Pat. No. 7,936,256, for example the gateway that is referenced as "communication gateway 135" in U.S. Pat. No. 7,936,256 and that is illustrated in the FIG. 1 described in the specification and other figures of U.S. Pat. No. 7,936,256.

Turning now to FIG. 2, this figure illustrates a functional block diagram of a mobile station 150 according to certain exemplary embodiments of the present invention. The mobile station 150 illustrated in FIG. 2 exemplifies the mobile station 150 illustrated in FIG. 1 and discussed above and will be described in further detail below in that exemplary context. In the illustrated embodiment, the mobile station 150 comprises two logical units, specifically mobile equipment 225 and a subscriber identity module 200.

The mobile equipment 225 comprises the radio components and provides network access through a radio interface, exemplarily embodied as a transceiver 230 and an associated antenna 220, as illustrated. The mobile equipment 225 further comprises computational elements, exemplarily embodied as a microprocessor module 205 and associated volatile memory 215 and nonvolatile memory 210. The transceiver 230 and its associated antenna 220 communicate data bidirectionally over the cellular network 175. The transceiver 230 comprises circuitry (not shown) for processing incoming and outgoing wireless signals through the cellular network system 175.

The microprocessor module 205 controls operations and/or telemetry of the mobile station 150 based on local sensory information and commands received via cellular network 175. The microprocessor module can comprise a microprocessor, microcontroller, controller, or other computing element that executes instructions or code.

In certain exemplary embodiments, the subscriber identity module 200 comprises a small circuit printed on a card that fits within or physically connects to the mobile equipment 225. In certain exemplary embodiments, the subscriber identity module 200 can comprise a "SIM card."

The term "SIM card," as used herein, is substantially consistent with typical industry terminology and generally refers to a small card that connects to a mobile station and that stores data regarding a subscriber's identity, such as information about one or more networks. For example, certain SIM cards can comprise an integrated circuit that securely stores an international mobile subscriber identity ("IMSI") and a related key that identifies and authenticates a subscriber on mobile telephony devices. While many SIM cards are removable from an associated mobile station to facilitate transfer to another mobile station, others may be permanently attached, for example via soldering.

Certain SIM cards contain a unique serial number known as an integrated circuit card identifier ("ICCID"), internationally unique number of the mobile user (IMSI), security authentication and ciphering information, temporary information related to the local network, a list of accessible services, and a password, for example a PIN and a PUK for PIN unlocking SIM cards typically store forbidden public land mobile network data.

In the illustrated embodiment, the subscriber identity module 200 comprises a microprocessor module 265 that comprises non-volatile memory 260 and volatile memory 255. The non-volatile memory 260 and the volatile memory 255 can be accessed by the mobile equipment 225 as well as by a computing element within the subscriber identity module 200, such as a microprocessor or microcontroller.

The subscriber identity module 200 comprises an operating system. In certain embodiments the operating system is based on proprietary or vendor-specific software, in which case the subscriber identity module 200 can be referred to as a native subscriber identity module. In certain embodiments, the operating system is based on JAVA card, in which case the subscriber identity module 200 can be referred to as a JAVA card subscriber identity module. JAVA card is a subset of JAVA programming language targeting embedded devices and can be based on standards. JAVA card facilitates running programs on the subscriber identity module that are hardware independent and interoperable. "JAVA" is a registered trademark of Oracle Corporation of Redwood Shores, Calif.

As will be discussed in further detail below, the subscriber identity module 200 comprises an applet 275 that manages forbidden public land mobile network data. In certain embodiments, the applet 275 is a JAVA applet. The applet 275 can comprise an associated timer 280 for triggering time-based actions, such as managing or resetting forbidden public land mobile network data or associated hardware. The applet 275 can be stored on a compute readable medium, for example in the volatile memory 255 or the nonvolatile memory 260 of the subscriber identity module 200. The applet 275 can be executed by the operating system of the subscriber identity module 200.

Either or both of the microprocessor module 205 and the microprocessor module 265 can comprise a variety of digital circuitry elements including flash memory, random access memory ("RAM"), a digital-to-analog converter ("DAC"), an analog-to-digital converter ("ADC"), and timing circuits. Flash memory can facilitate software upgrades or replacements. RAM can support data storage and program execution.

Either or both of the microprocessor module 205 and the microprocessor module 265 can further comprise various types of memory such as any one or combination of volatile memory elements (e.g., forms of RAM such as DRAM, EPROM, EEPROM, SRAM, SDRAM, etc.) and nonvolatile memory elements (e.g., ROM, hard drive, tape, CDROM, etc.). Moreover, the memory may incorporate electronic, magnetic, optical, and/or other types of storage media and can have a distributed architecture, where various components are situated remote from one another, but can be accessed at the mobile station 150.

A "computer-readable medium" can be any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM, EEPROM, or flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Either or both of the microprocessor module 205 and the microprocessor module 265 can also comprise logic implemented in hardware with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Further a microcontroller, functioning as a microprocessor, can comprise an integration of such digital logical devices.

Turning now to FIG. 3, this figure illustrates a flowchart for a process 300 for managing a subscriber identity module 200 according to certain exemplary embodiments of the present invention. In an exemplary embodiment, the applet 275 executing on the subscriber identity module 200 implements process 300. Accordingly, FIG. 3 can be viewed as providing an exemplary logic flow of the applet 275.

Certain steps in the process 300 (as well as other processes and methods described herein) may naturally precede others for the present invention to function as described. However, the present invention is not limited to the order of the steps described if such order or sequence does not alter the functionality of the present invention to the extent of rendering the present invention inoperable or nonsensical. Accordingly, those of skill in the art will appreciate that certain steps may be performed before or after other steps or in parallel with other steps without departing from the scope and spirit of the present invention.

The present invention can include one or multiple computer programs embodying certain functions disclosed herein in text and/or as illustrated in functional block diagrams and flow charts. However, it should be apparent that there could be many different ways of implementing aspects of the present invention in computer programming, and the invention should not be construed as limited to any one set of computer program instructions. Further, a skilled programmer would be able to prepare such computer programs without undue experimentation or difficulty based on the exemplary functional block diagrams, flow charts, and associated description in the application text.

Accordingly, disclosure of a particular set of program code instructions is not considered necessary for an adequate understanding of how to make and use the present invention. The inventive functionality of certain programming aspects of the present invention will be explained in more detail in the following description in conjunction with FIGS. 3 and 4 illustrating representative functions and program flow and processes.

Referring now to FIG. 3, at step 305 of process 300, the timer 280 of the applet 275 increments when transmission of a message containing location information is detected. Location messages are transmitted on average about every 30 seconds, each location message can be used to clock time. In certain embodiments, each location message can comprise a status command. For example, detection of twenty location messages would provide an indication of a passage of approximately ten minutes of time.

At inquiry step 310, the applet 275 determines whether timer 280 has counted a sufficient number of location messages to indicate that a day has passed. In the exemplary embodiment where the cellular network 175 transmits location messages on 30-second intervals, a count of 2880 messages indicates that 24 hours have passed.

If inquiry step 310 determines that at least 24 hours have passed, then the applet 275 executes step 350, which will be discussed below.

If inquiry step 310 determines that 24 hours have not passed, then the applet 275 waits until the terminal profile ("TP") of the SIM application toolkit is received at step 315. The TP is a list of SIM application toolkit facilities that are supported by the mobile equipment 225. In other terms, the terminal profile indicates if the device supports Provide Local Information. If the TP status received by the applet 275 supports the "Provide Local Information", the applet 275 sends the Provide Location Information proactive command to the mobile equipment 225 in order to retrieve the (MCC/MNC) and service level (No Service, Limited Service and Normal Service) in step 325. If TP has not been received, then the applet 275 exits process 315 at step 320. If on the other hand, TP has been received, then processing proceeds to step 325.

At step 325, the applet 275 determines or provides local information, the country code ("MCC") and the network code ("MNC"). At inquiry step 330, the applet 275 determines if the country code and the network code are valid and if service is normal. If the determination is positive, then process 300 executes step 335 to reset the 15-minute count and then exits at step 320.

If the applet 275 determines at inquiry step 325 that service is not normal or that the country code and the network code are invalid, then process 300 proceeds to step 340.

At step 340, the applet 275 increments a 15 minute time counter. At inquiry step 345, the applet determines whether the 15 minute time counter is greater than or equal to 30 counts (where each count corresponds to about 30 seconds). If the determination is negative, then process 300 proceeds to step 320 and exits. If on the other hand, the determination is positive, then process 300 proceeds to step 350. Process 300 can branch to step 350 from step 345 or from step 310 as described above.

At step 350, the applet 275 clears the forbidden public land mobile network list (EF FPLMN), clears the network parameters of the last successful registration (EF LOCI), clears the upper layer in the general packet radio service ("GPRS") network (ER LOCI GPRS, and repopulates the fields (refresh reset). Following execution of step 340 process 300 exits at step 320.

Turning now to FIG. 4, this figure illustrates a poll interval logic diagram for managing a subscriber identity module 200 according to certain exemplary embodiments of the present invention. FIG. 4 illustrates how applying the increment clock step 450 to typical steps in a GSI registration process provides the subscriber identity module 200 with a clocking or timing capability. Accordingly, the subscriber identity module 200 can take actions at specific times, periodically, or on predetermined intervals without necessarily having a conventional clock.

Referring now to FIGS. 3 and 4, the applet 275 (which can comprise a JAVA software program) is installed in the subscriber identity module 200 that is associated with mobile equipment 225 of the mobile station 150. The applet 275 can be downloaded to the subscriber identity module 200 over the cellular network 175 from the gateway 190. The applet 275 resets certain data files, such as the forbidden public land mobile network data file, located in the subscriber identity module 200 and refreshes both the subscriber identity module 200 and the mobile equipment 225 each time the mobile station 150 fails registration as well as on a daily basis. As per the global system for mobile communications standards, some reject codes may restrict the subscriber identity module 200 from registering onto an available global system for mobile communications networks until a power cycle occurs. The refresh of the subscriber identity module 200 and the mobile equipment 225 can comprise such a power cycle. Each reject code can have a different associated behavior. Some reject codes may be implicit type rejects that force the modem to not try again until the next power cycle (like illegal mobile station and others). Some reject codes force the modem to retry after a predetermined time or for a predetermined amount number of attempt, for example.

Via the applet 275, a subscriber identity module 200 resident autonomous method resolves issues caused by such network reject codes. The applet 275 on the subscriber identity module 200 can determine if the mobile equipment 225 has failed to register for nominally 15 minutes based upon use of the status command, which is typically expected to be sent approximately every 30 seconds in accordance with industry standards. If the mobile equipment 225 fails to register to a network for such a predetermined period, the following steps execute:

1. The subscriber identity module 200 autonomously resets data files for forbidden public land mobile networks, the parameters of last successful registration, and the upper layer of the general packet radio service network.

2. The subscriber identity module 200 autonomously requests a refresh proactive command with option reset.

3. The mobile equipment 225 and the subscriber identity module 200 reboot.

At a predetermined time, for example once per day, the applet 275 on the subscriber identity module 200 autonomously triggers a reset of the subscriber identity module 200 and the mobile equipment 225. The subscriber identity module 200 autonomously counts 2880 status commands (24 hr/day×60 min/hr×2 STATUS commands/minute). This count triggers a reset as follows:

1. The subscriber identity module 200 autonomously resets data files for forbidden public land mobile networks, the parameters of last successful registration, and the upper layer of the general packet radio service network.

2. The subscriber identity module 200 autonomously requests a refresh proactive command with option reset.

3. The subscriber identity module 200 and the mobile equipment 225 reboots.

Technology has been described for managing subscriber identity modules and for managing forbidden public land mobile network data. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown herein will suggest themselves to those skilled in the art, and ways of constructing other embodiments of the present invention will appear to practitioners of the art. Therefore, the scope of the present invention is to be limited only by the claims that follow.

What is claimed is:

1. A mobile station for providing a communications link for a machine-to-machine (M2M) application, the mobile station comprising:
   mobile equipment comprising:
      a microprocessor module operative to control operation of telemetry of the mobile station based on local sensor information and commands received via a cellular network;
      a transceiver, operatively coupled to the microprocessor module, operative to process wireless signals incoming from and outgoing to the cellular network; and
      an antenna, associated with the transceiver, that conducts the wireless signals;
   a subscriber identity module (SIM); and
   a computer program loaded on the subscriber identity module, the computer program comprising a timer that increments time based on detecting transmissions of periodic messages containing location information, wherein the timer is operative to trigger one or more time-based actions responsive to the timer determining that a predetermined amount of time has passed by counting the transmissions of periodic messages and comparing the count to a threshold number that is greater than one, the threshold number equating to the predetermined amount of time according to transmission time interval,
   wherein the subscriber identity module comprises forbidden public land mobile network data stored in memory of the subscriber identity module and managed by the one or more time-based actions that the timer is operative to trigger.

2. The mobile station of claim 1, wherein the periodic messages comprise status commands.

3. The mobile station of claim 1, wherein the periodic messages are sent approximately every 30 seconds, and wherein the predetermined amount of time is approximately one day.

4. The mobile station of claim 1, wherein the periodic messages are sent on a time interval set in an industry standard, and wherein the threshold number is not less than 20.

5. A mobile station for providing a communications link for a machine-to-machine (M2M) application, the mobile station comprising:
mobile equipment comprising:
a microprocessor module operative to control operations of telemetry of the mobile station based on local sensor information and commands received via a cellular network;
a transceiver, operatively coupled to the microprocessor module, operative to process wireless signals incoming from and outgoing to the cellular network; and
an antenna, associated with the transceiver, that conducts the wireless signals;
a subscriber identity module (SIM); and
a computer program loaded on the subscriber identity module, the computer program comprising a timer that increments time based on transmission of periodic messages containing location information, wherein the timer is operative to trigger one or more time-based actions,
wherein the computer program comprises an applet that clears a forbidden public land mobile network from a forbidden public land mobile network data file when the timer counts a predetermined number of the periodic messages.

6. A mobile station for a machine-to-machine (M2M) application, comprising:
a transceiver that is configured to send telemetry data over a cellular network to a gateway; and
a subscriber identity module (SIM) comprising instructions for:
tracking time from within the subscriber identity module by counting communications that carry location information and that are transmitted periodically over the cellular network;
determining if the tracked time has met a threshold by determining if a predetermined number of the communications have been counted, the predetermined number at least two; and
if the tracked time has met the threshold, modifying forbidden public land mobile network data stored in memory of the subscriber identity module.

7. A mobile station for a machine-to-machine (M2M) application, comprising:
a transceiver that is configured to send telemetry data over a cellular network to a gateway; and
a subscriber identity module (SIM) comprising instructions for:
tracking time from within the subscriber identity module by counting communications that carry location information and that are transmitted periodically over the cellular network;
determining if the tracked time has met a threshold by determining if a predetermined number of the communications have been counted; and
if the tracked time has met the threshold, modifying data stored in the subscriber identity module,
wherein modifying data comprises clearing a forbidden land mobile network from a forbidden public land mobile network data file stored in memory of the subscriber identity module.

8. The mobile station of claim 6, wherein modifying the forbidden public land mobile data comprises automatically clearing an entry of a data file stored at the subscriber identity module.

9. The mobile station of claim 6, wherein modifying the forbidden public land mobile data comprises periodically deleting one or more networks from a list of networks stored in memory of the subscriber identity module.

10. The mobile station of claim 6, wherein the telemetry data comprises local sensor information.

11. The mobile station of claim 6, wherein the subscriber identity module comprises an applet that comprises a timer for triggering time-based actions according to the tracked time.

12. The mobile station of claim 6, wherein the communications that carry location information and that are transmitted periodically over the cellular network are transmitted on a time interval of approximately 30 seconds.

13. The mobile station of claim 6, wherein the communications that carry location information and that are transmitted periodically over the cellular network are transmitted on a time interval set in accordance with an industry standard.

14. A mobile station, comprising:
a SIM card comprising an applet; and
a transceiver that is operatively coupled to the SIM card, that provides connectivity to a cellular network via an antenna, and that is operative to send telemetry information over the cellular network for a machine-to-machine (M2M) application,
wherein the applet comprises a timer that increments time based on detection of transmission of periodic messages containing location information, the transmissions occurring on a time interval, and
wherein the applet comprises instructions for changing a data file stored on the SIM card when the timer increments to a predetermined level indicating passage of a predetermined amount of time that is at least twice the time interval,
wherein the data file comprises a forbidden public land mobile network list, and
wherein changing the data file comprises resetting the data file.

15. The mobile station of claim 14, wherein the mobile station comprises mobile equipment, and
wherein the applet further comprises instructions for:
using the timer to determine if the mobile equipment has not registered for a predetermined amount of time; and
rebooting the mobile equipment if the mobile equipment has not registered for the predetermined amount of time.

16. The mobile station of claim 14, wherein each periodic message containing location information comprises a status command.

17. The mobile station of claim 14, wherein the time interval is set in accordance with an industry standard and the predetermined amount of time comprises 24 hours.

18. The mobile station of claim 14, wherein the telemetry data comprises local sensor information.

* * * * *